(12) United States Patent
Callaway et al.

(10) Patent No.: US 8,719,599 B2
(45) Date of Patent: May 6, 2014

(54) MONITORING SUBSYSTEM POWER

(75) Inventors: Robert P. Callaway, Vancouver, WA (US); Douglas Harriman, Portland, OR (US); Jon Johnson, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 350 days.

(21) Appl. No.: 13/210,006

(22) Filed: Aug. 15, 2011

(65) Prior Publication Data

US 2013/0046997 A1 Feb. 21, 2013

(51) Int. Cl.
| | |
|---|---|
| *G06F 1/00* | (2006.01) |
| *H02J 3/14* | (2006.01) |
| *G01R 19/12* | (2006.01) |
| *B41J 29/393* | (2006.01) |
| *B41J 2/00* | (2006.01) |
| *H04N 1/00* | (2006.01) |
| *H04N 1/46* | (2006.01) |
| *G03G 15/00* | (2006.01) |
| *G01R 21/00* | (2006.01) |

(52) U.S. Cl.
USPC ............... 713/300; 307/38; 307/152; 347/19; 347/192; 358/401; 358/505; 399/37; 399/88; 702/60

(58) Field of Classification Search
USPC .............. 713/300; 307/38, 152; 347/19, 192; 358/401, 505; 399/37, 88; 702/60
See application file for complete search history.

(56) References Cited

U.S. PATENT DOCUMENTS

| | | | |
|---|---|---|---|
| 6,072,585 A | 6/2000 | Dutton et al. | |
| 6,496,665 B2 * | 12/2002 | Umezawa et al. | ............... 399/67 |
| 6,543,875 B2 | 4/2003 | Gomez et al. | |
| 7,353,410 B2 * | 4/2008 | Desai et al. | .................... 713/300 |
| 7,383,451 B2 * | 6/2008 | Matsushima et al. | ......... 713/300 |
| 7,412,185 B2 | 8/2008 | Hall et al. | |
| 7,510,276 B2 | 3/2009 | Kruijt | |
| 7,565,562 B2 | 7/2009 | Chary | |
| 7,856,568 B2 * | 12/2010 | Fuchikami et al. | ........... 713/322 |
| 2004/0003303 A1 * | 1/2004 | Oehler et al. | ................. 713/300 |
| 2004/0073824 A1 | 4/2004 | Machida | |

* cited by examiner

*Primary Examiner* — Stefan Stoynov (57) ABSTRACT

A method for monitoring subsystem power includes, with a power control system of an electronic device, receiving energy usage data from one of a plurality of subsystems within the electronic device, with the power control system, maintaining energy usage data for the plurality of subsystems within the electronic device, and with the power control system, providing integrated energy usage data to one of the plurality of subsystems.

18 Claims, 5 Drawing Sheets

Table (400)

| Unique Identifier (402) | Last Time Report (404) | Total Energy Usage (406) | Average Energy Usage (408) | Current Energy Usage (410) |
|---|---|---|---|---|
| ABC | 2:35:56 | 11 | 2 | .5 |
| DEF | 2:45:16 | 8 | 1 | .2 |
| GHI | 2:45:18 | 3 | 2 | .3 |
| KLM | 2:37:29 | 64 | 6 | 1.2 |
| NOP | 2:40:07 | 37 | 2 | .4 |
|  |  | 135 | 14 |  |

Total Energy Usage Sum (412)

Average Energy Usage Rate Sum (414)

MONITORING SUBSYSTEM POWER

BACKGROUND

Many electronic devices include multiple subsystems. Each of these subsystems consumes energy at a different rate. For example, an all-in-one printing device may include a printing subsystem, a fax subsystem, and a scanning subsystem. Furthermore, each of these subsystems may include further subsystems. For example, the printer system may have a servo motor system to move a substrate such as paper in relation to a printhead system. The servo system and the printhead system may also consume energy at different rates.

Electronic devices such as all-in-one printers are powered through use of a power supply. The power supply is typically integrated into the electronic device itself. The power supply is typically designed to convert an alternating current at a relatively high voltage into a direct current at a lower voltage that is used by the electronic device. This conversion process often causes some energy to be transferred into thermal energy. Thus, the thermal capacity of the power supply should be such that it can handle the power levels that will be drawn by the subsystems within the electronic device.

BRIEF DESCRIPTION OF THE DRAWINGS

The accompanying drawings illustrate various examples of the principles described herein and are a part of the specification. The drawings are merely examples and do not limit the scope of the claims.

Throughout the drawings, identical reference numbers designate similar, but not necessarily identical, elements.

DETAILED DESCRIPTION

As mentioned above, electronic devices such as all-in-one printers are powered through use of a power supply. The power supply is designed to convert an alternating current at a relatively high voltage into a direct current at the proper voltage that is used by the electronic device. This conversion process often causes some energy to be transferred into thermal energy. Thus, the thermal capacity of the power supply should be such that it can handle the power levels that will be drawn by the subsystems within the electronic device.

A power supply for a particular electronic device is designed to handle the peak energy consumption rate at which the device may operate. However, the electronic device rarely operates at this peak level. Rather, the average energy usage level is much lower. Thus, the power supply has a greater thermal capacity than is often needed. A power supply with a larger thermal capacity is generally more costly than a power supply with a smaller thermal capacity.

In light of this and other issues, the present specification discloses methods and systems for monitoring energy usage of subsystems within an electronic device. The rate at which energy is consumed is referred to as power. With this power information, the subsystems may modify behavior to keep the entire system from exceeding a predefined power level threshold. This allows for a less costly power supply to be used with the electronic device.

According to certain illustrative examples, a particular electronic device may include a power control system that maintains energy usage information about each of the subsystems within the electronic device. Each of the subsystems includes a mechanism for measuring the amount of energy consumed. The subsystems may also have a time measurement system. Each subsystem will collect and report energy usage data to the power control system. This energy usage data may include the instantaneous energy usage rate as well as the total amount of energy consumed since that subsystem was turned on. The energy usage reports may also include a time stamp. Using this time stamp and the total energy usage, the power control system can calculate the average rate at which energy is consumed for that subsystem.

Through use of methods and systems embodying principles described herein, an efficient way of monitoring energy usage of an electronic device may be realized. Rather than having each subsystem manage its own energy usage, a central power control system can monitor the energy usage rates for each of the subsystems. This allows for a more dynamic allocation of power within the electronic device. For example, if one particular subsystem is currently not consuming any energy, then another subsystem may be able to use energy at a faster rate. This is more efficient than setting an energy usage limit on each subsystem individually.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Figure 1:
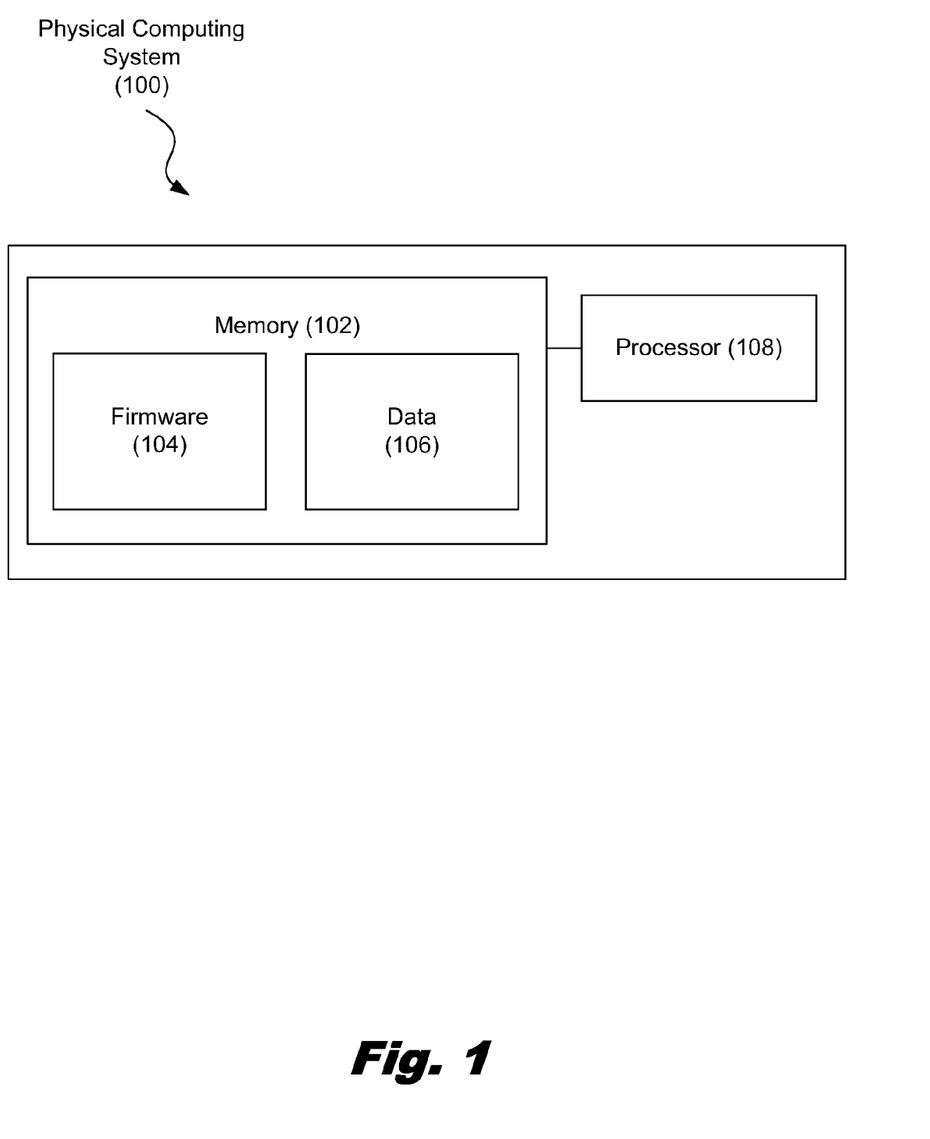
FIG. 1 is a diagram showing an illustrative physical computing system, according to one example of principles described herein.

Referring now to the figures, FIG. 1 is a diagram showing an illustrative physical computing system (100) that may be used to manage a subsystem within an electronic device. For example, the physical computing system may be a control system for a servo motor system within a printing device. According to certain illustrative examples, the physical computing system (100) includes a memory (102) having firmware (104) and data (106) stored thereon. The physical computing system (100) also includes a processor (108) and a user interface (110).

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory." A further form of memory is a Read Only Memory (ROM). Such types of memory are often used to store operating systems for control systems that manage hardware within an electronic device. The physical computing system (100) also includes a processor (108) for executing the firmware (104) and using or updating the data (106) stored in memory (102).

Figure 2:
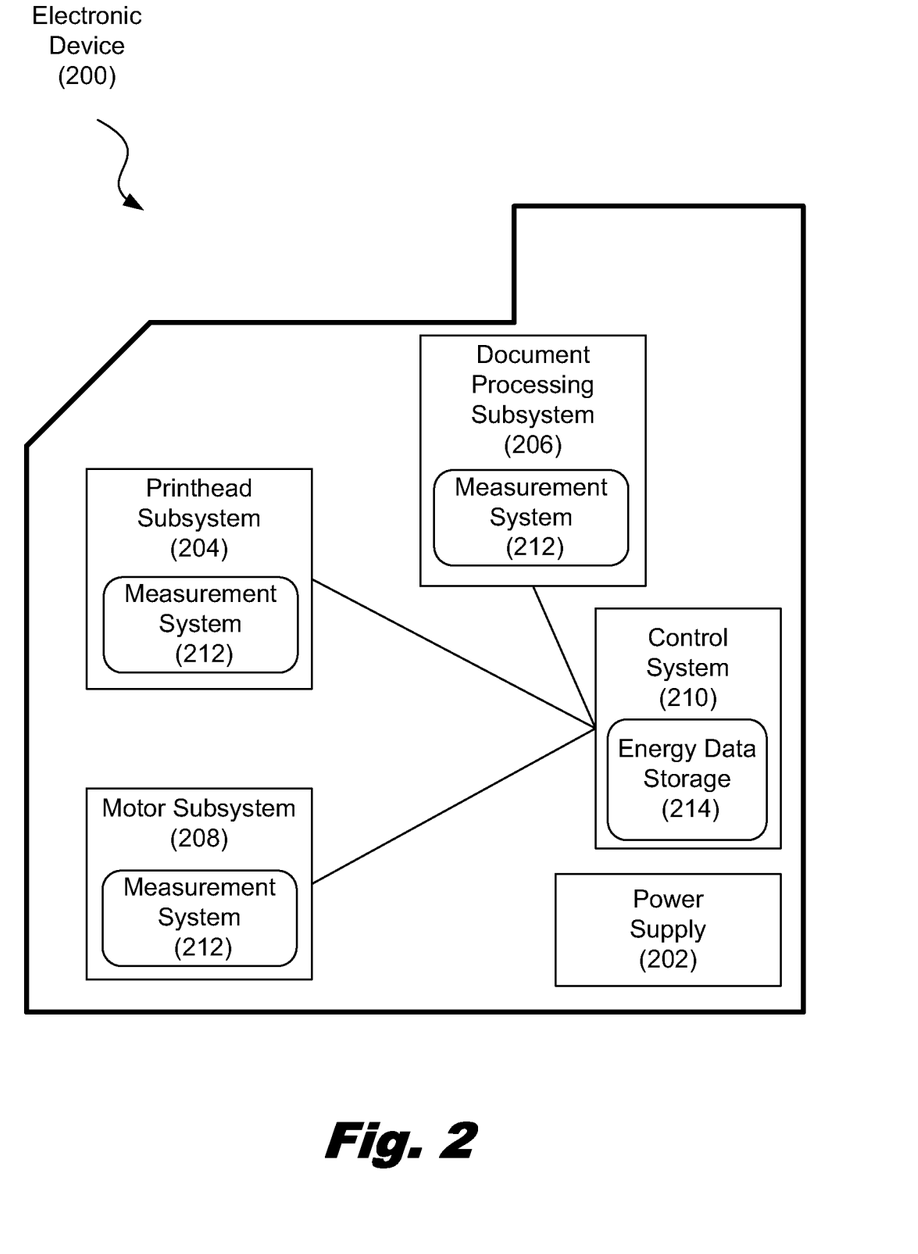
FIG. 2 is a diagram showing an illustrative electronic device, according to one example of principles described herein.

FIG. 2 is a diagram showing an illustrative electronic device (200). In this example, the electronic device is an all-in-one printing system. According to certain illustrative examples, the printing system includes a print subsystem (208), a fax subsystem (204), and a scan subsystem (206). Each subsystem includes a measurement system (212) for measuring energy usage of that subsystem. Each subsystem may then report that energy usage to a central power control system (210). The power control system (210) will then store that data in an energy data storage device (214). Each subsystem may access information within the energy data storage to adapt its behavior so that the overall energy usage of the electronic device operates within the constraints of the power supply (202) for that device.

The measurement system (212) of each subsystem is configured to measure the energy consumed by that subsystem. Energy refers to the ability a system has to affect another system. In the case of an electronic device, energy usage refers to the amount of electrical energy that is consumed. The rate at which electrical energy is consumed is referred to as electrical power. Power is often measured in watts. Electrical energy is often measured in kilowatt hours. As mentioned above, a power supply (202) is designed to transfer one form of electrical energy into another form of electrical energy. Typically, the power supply (202) transforms an Alternating Current (AC) form that is supplied by an electrical outlet to a Direct Current (DC).

Electronic devices typically operate on a DC voltage. The power supply (202) of an electronic device has to be of sufficient size and have a thermal capacity to handle the total power consumption of each subsystem within the entire electronic device. Every subsystem within the electronic device consumes electrical energy at a different rate. For example, the motor subsystem (208) may consume energy faster than the printhead subsystem (204). Furthermore, different subsystems may be operating while other subsystems are not.

Typically, a power supply that is placed within an electronic device during the manufacturing process is selected so that it can handle the peak energy consumption rate at which the electronic device as a whole may operate. This peak energy consumption rate may be determined by summing the peak energy consumption rate of each subsystem. However, it is not often that each subsystem is operating at its peak usage rate simultaneously. Yet, the power supply still has to be capable of handling this peak energy consumption rate in the event that the system does actually hit that rate. Thus, for much of the time, the larger and more costly power supply is not in full use.

In light of this issue, the present specification discloses a method for monitoring the energy usage on a subsystem level. Specifically, a central power control system monitors the energy usage by each subsystem. By doing so, the power control system can instruct the individual subsystems to adjust their operating behavior in order to keep the total energy usage rate below a predefined threshold. This predefined threshold may be set according to a smaller and less costly power supply to be used in the electronic device.

In one example, the motor subsystem (208) may have a particular job to perform. The motor subsystem may have an estimate of how much energy this job will consume and at what rate the job will consume the energy. The motor subsystem (208) may then check in with the power control system (210) to determine what the present energy consumption rate of the entire electronic device as well as the running average. If few other subsystems are operating, then the motor subsystem (208) may perform its job at a faster rate, thus consuming energy at a faster rate.

However, if other subsystems are currently using energy at a relatively high rate, then the motor subsystem (208) may perform the job more slowly in order to prevent the total energy usage rate from surpassing the threshold rate. As the motor subsystem (208) performs this job, it will inform the power control system (210) of its intended rate of energy consumption during the time period of performing the job. This will allow other subsystems to adapt their behavior if necessary in order to prevent the total energy usage rate from surpassing the threshold rate.

Figure 3:
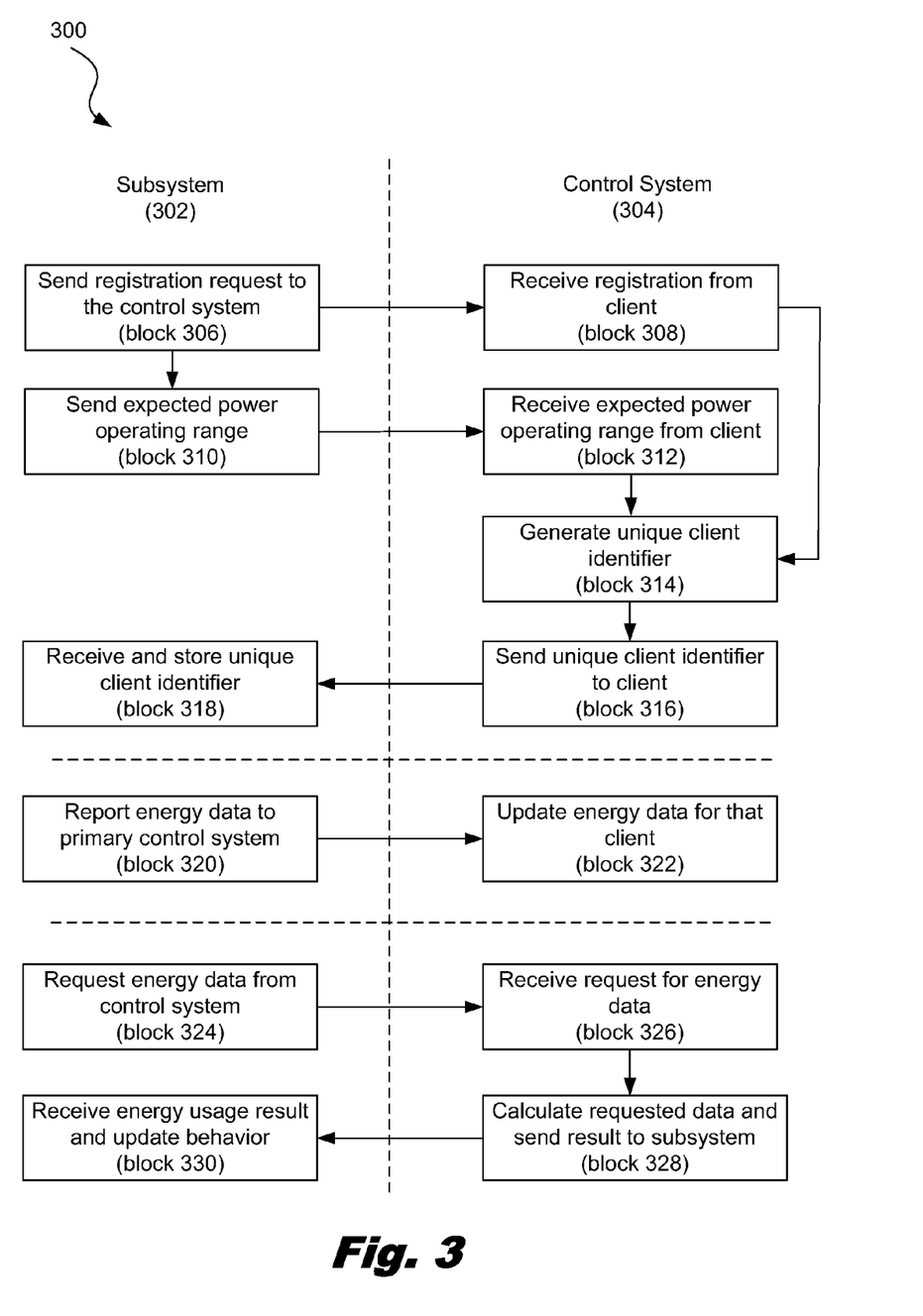
FIG. 3 is a flowchart showing an illustrative process for monitoring energy usage among subsystems within an electronic device, according to one example of principles described herein.

FIG. 3 is a flowchart showing an illustrative process for monitoring energy usage among subsystems within an electronic device. The flowchart illustrates processes that are performed by a subsystem (302) and processes that are performed by the power control system (304). A variety of exchanges between a subsystem and the power control system may occur. FIG. 3 illustrates some examples of such exchanges but is not intended to be an exhaustive list.

According to certain illustrative examples, when an electronic device is turned on, some or all of the subsystems may send (block 306) a registration request to the power control system. This may allow the power control system to know which subsystems are currently operating. For example, if the electronic device is an all-in-one printing device that includes fax, scan, copy, and print functions, it may be the case that only the print function is turned on. Thus, the fax, scan, and copy subsystem may not be used and thus the power management system does not need to consider energy usage from these subsystems.

In addition to sending a registration request, a subsystem (302) may send (block 310) an expected power operating range. This will let the power control system (304) know the range of energy usage rates at which the subsystem is likely to operate.

Upon receiving (block 308) a registration request and possibly receiving (block 310) an expected power operating range from the subsystem, the power control system (304) may generate (block 314) a unique client identifier for that subsystem. The power control system (304) can then send (block 316) the unique client identifier to the subsystem (302). Upon receiving (block 318) this unique client identifier, the subsystem will then store the client identifier. This client identifier can be used to identify the subsystem (302) for any communication exchanges thereafter.

By having each subsystem register, the power control system can better determine which subsystems should be considered when calculating the total energy usage for the electronic device. It may be the case that a particular electronic device includes modular components. Thus, when some of those modular components are not present or are not in use, then the power control system will not have to consider those systems for any energy usage calculations. Furthermore, having the subsystems register with the power control system allows for greater flexibility during manufacturing processes. For example, certain subsystems may be used in a variety of different types or models of electronic devices. By having each subsystem register with the power control system, a generic power control system can be manufactured for each of several different types and models of electronic devices.

At particular points in time, a subsystem (302) may compile and report (block 320) energy data to the power control system (304). In some cases, this may be done at regular intervals. At each regular interval, the subsystem may report how much energy it has used since the last report. The subsystem may also report other data such as a peak energy rate. In some cases, the subsystem (302) may only report to the power control system (304) when the subsystem has completed a job.

Upon receiving an energy data report from a subsystem (302), the power control system (304) will update (block 322) the energy usage information for that client. The power control system (304) may also perform certain calculations. For example, the subsystem (302) may only report a total energy usage since the last report. If the energy data is not reported at regular intervals, then the energy data report may include a time stamp so that the power control system (304) knows the period of time over which the total amount of energy for that subsystem (302) was consumed. Using this timing data and energy usage data, the power control system (304) can calculate an average energy usage rate for that subsystem (302). This information may then be made available to that subsystem (302) as well as other subsystems.

At certain points in time, the subsystem (302) may request (block 324) energy data from the power control system (304). Upon receiving (block 326) this request, the power control system (304) will calculate (block 328) any data that should be calculated and send the result to the subsystem. For example, if the subsystem requests a current energy usage rate of the entire electronic device, then the power control system will add the energy usage rates for each of the subsystems and provide that result to the requesting subsystem. Upon receiving (block 330) this data, the subsystem (302) may update its behavior accordingly.

For example, if a particular subsystem obtains the present energy usage rate for the entire electronic device and the subsystem intends to perform a job that will consume energy at a particular rate, the subsystem will determine if performing that job will cause the total energy usage rate to exceed the predefined threshold. If so, then the subsystem may perform the job at a slower pace in order to reduce the rate at which energy is consumed. For example, a servo motor subsystem of a printing device may have to move a piece of paper into a different position. To reduce the energy consumption rate, the servo motor may move the paper at a slower rate in order to keep the total energy usage rate below the threshold. However, if the current energy usage rate for the entire electronic device is relatively low, then the servo motor system may move the piece of paper at a faster rate than normal. The subsystem can thus know that performing such movement, which causes a higher consumption of energy usage, will not cause the total energy usage rate for the entire electronic device to exceed the threshold.

Figure 4:
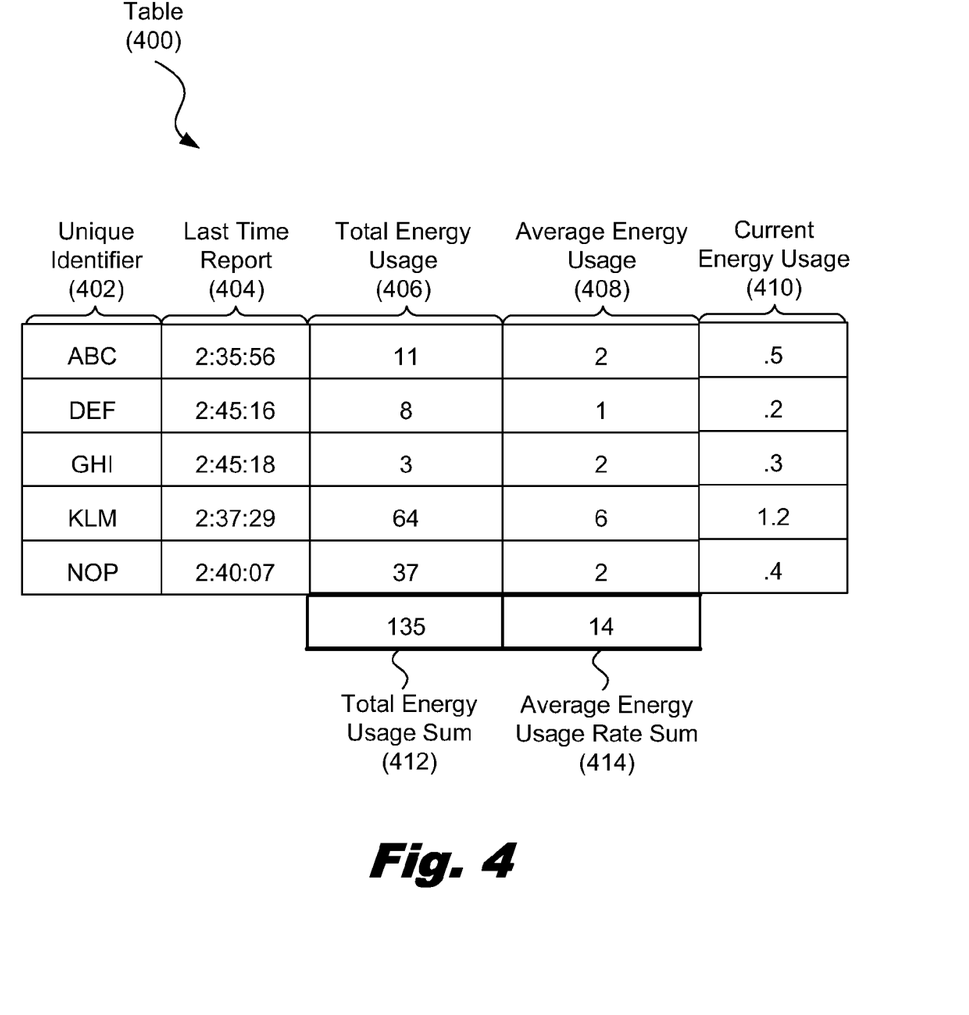
FIG. 4 is a diagram showing an illustrative table for power usage data, according to one example of principles described herein.

FIG. 4 is a diagram showing an illustrative table (400) for power usage data. As mentioned above, the power control system of an electronic device may include data storage for storing energy usage data for the subsystems within the electronic device. According to certain illustrative examples, the table (400) includes a unique identifier column (402), a last time report column (404), a total energy usage column (406), an average energy usage column (408), and a current energy usage column (410).

In this example, the electronic device includes five active subsystems that have registered with the power control system. Each subsystem has been provided with a unique identifier as indicated in the unique identifier column (402). It may be the case that some subsystems will not register, but still provide power usage data to the power control system. In such cases, the power control system will still consider that energy usage when calculating total energy usage for the entire electronic device. However, such energy usages will not be uniquely identified to those non-registered subsystems.

The last time report column (404) indicates the time stamp of the last energy usage report from the associated subsystem. This information may be used to determine an average energy rate. For example, the subsystem may provide only its total energy usage and the time at which the energy data report was sent. The power control system can then calculate the time difference between such energy data reports as well as the difference between the total energy consumed at those points in time. Using this information, an average energy usage rate can be obtained.

The total energy usage column (406) indicates the total amount of energy the associated subsystem has used since the electronic device was powered on. The average energy usage column (408) indicates the average energy usage rate for the associated subsystem. It may be the case that a particular subsystem is not powered on until sometime after the electronic device has been turned on. For example, it may be the case that the scan subsystem of an all-in-one printer is not powered on until the user wishes to use the scan feature. Thus, the average energy usage rate for that subsystem may only factor in the time that that particular subsystem has been powered on and not the total time the entire printer system has been powered on.

The current energy usage column (410) indicates the current rate at which the associated subsystem is using energy. In some cases, this number may be based on a calculation made between the last two energy data reports sent by the associated subsystem. The current energy usage can be used to make sure that the current energy usage rate for the electronic device does not exceed the limitations of the power supply.

The table (400) also includes a total energy usage sum (412) and an average energy usage rate sum (414). The total energy usage sum (412) indicates the total amount of energy that has been used by the electronic device since it was powered on. This sum includes the energy usage by each of the subsystems as well as any non-registered subsystems which may report energy usage to the power control system. Likewise, the average energy usage rate sum (410) indicates the average energy usage by the electronic device. This number may factor in non-registered subsystems as well.

Figure 5:
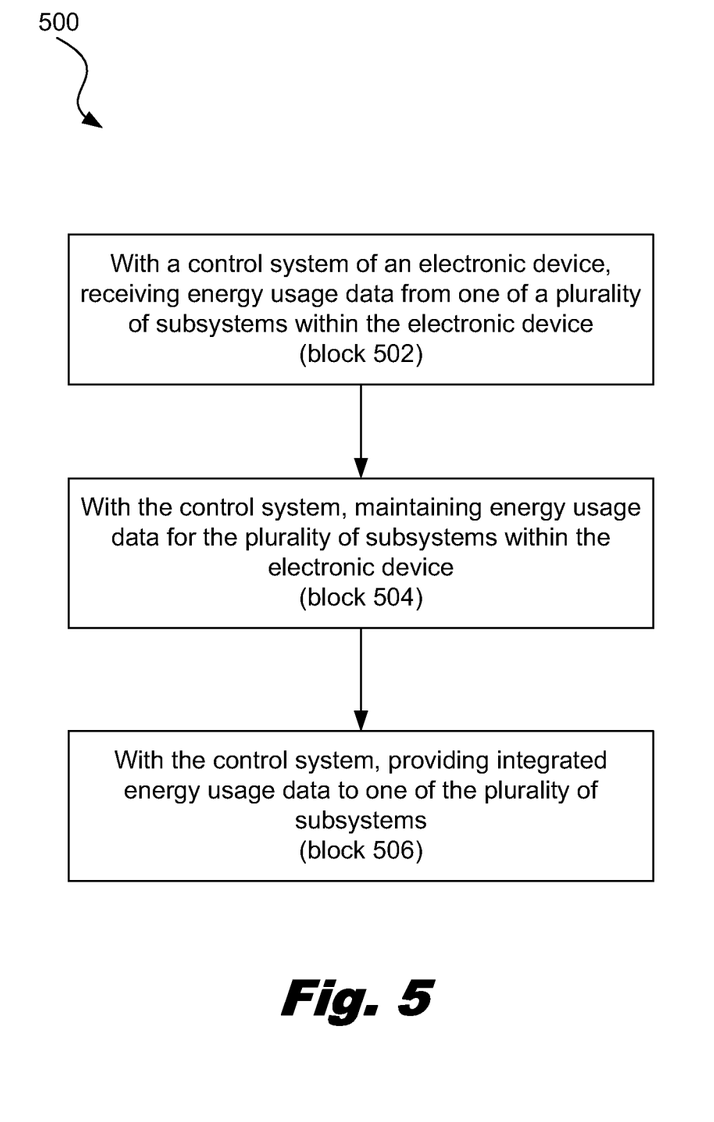
FIG. 5 is a flowchart showing an illustrative method for subsystem power monitoring, according to one example of principles described herein.

FIG. 5 is a flowchart showing an illustrative method (500) for subsystem power monitoring. According to certain illustrative examples, the method includes, with a control system of an electronic device, receiving (block 502) energy usage data from one of a plurality of subsystems within the electronic device, with the control system, maintaining (block 504) energy usage data for the plurality of subsystems within the electronic device, and with the control system, providing (block 506) integrated energy usage data to one of the plurality of subsystems.

In conclusion, through use of methods and systems embodying principles described herein, an efficient way of monitoring energy usage of an electronic device may be realized. Rather than having each subsystem manage its own energy usage, a central control system can manage this power. This allows for a more dynamic allocation of power within the electronic device. For example, if one particular subsystem is not using any energy, then another subsystem may be able to use energy at a faster rate. This is more efficient than setting an energy usage limit on each subsystem individually.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for monitoring subsystem power, the method comprising:
   with a power control system of an electronic device, receiving energy usage data from one of a plurality of subsystems within said electronic device;
   with said power control system, maintaining energy usage data for said plurality of subsystems within said electronic device;
   with said power control system, providing integrated energy usage data to one of said plurality of subsystems;
   with said power control system, receiving a request from one of said plurality of subsystems to register with said control system;
   with said power control system, generating a unique client identifier for said one of said plurality of subsystems; and
   with said power control system, sending said unique client identifier to said one of said plurality of subsystems.

2. The method of claim 1, further comprising, with said one of said plurality of subsystems, altering an operating behavior to keep a total energy usage rate of said electronic device below a predefined threshold.

3. The method of claim 2, wherein said energy usage rate comprises one of: an instantaneous energy usage rate and an average energy usage rate.

4. The method of claim 2, wherein said predefined threshold is set based on characteristics of a power supply of said electronic device.

5. The method of claim 1, further comprising, with said power control system, receiving an expected power usage range from said one of said plurality of subsystems along with said request.

6. The method of claim 1, wherein said energy usage data comprises at least one of: a cumulative energy usage and a time stamp.

7. An electronic device comprising:
   a plurality of subsystems; and
   a control system comprising:
      at least one processor;
      a memory communicatively coupled to the at least one processor, the memory comprising computer executable code that, when executed by the at least one processor, causes the at least one processor to:
         receive energy usage data from one of said plurality of subsystems within said electronic device;
         maintain energy usage data for said plurality of subsystems within said electronic device; and
         provide integrated energy usage data to one of said plurality of subsystems;
         receive a request from one of said plurality of subsystems to register with said control system;
         generate a unique client identifier for said one of said plurality of subsystems; and
         send said unique client identifier to said one of said plurality of subsystems.

8. The device of claim 7, wherein a processor of said one of said plurality of subsystems is to alter an operating behavior of said one of said plurality of subsystems to keep a total energy usage rate of said electronic device below a predefined threshold.

9. The device of claim 8, wherein said energy usage rate comprises one of: an instantaneous energy usage rate and an average energy usage rate.

10. The device of claim 8, wherein said predefined threshold is set based on characteristics of a power supply of said electronic device.

11. The device of claim 7, wherein said processor is further to receive an expected power usage range from said one of said plurality of subsystems along with said request.

12. The device of claim 7, wherein said energy usage data comprises at least one of: a cumulative energy usage and a time stamp.

13. A method for monitoring subsystem power, the method comprising:
   with a control system of an electronic device, receiving energy usage data from one of a plurality of subsystems within said electronic device;
   with said control system, maintaining energy usage data for said plurality of subsystems within said electronic device;
   with said control system, providing integrated energy usage data to one of said plurality of subsystems;
   with said control system, requesting that said one of said plurality of subsystems alter an operating behavior to keep a total energy usage rate of said electronic device below a predefined thresholds;
   with said control system, receiving a request from one of said plurality of subsystems to register with said control system;
   with said control system, generating a unique client identifier for said one of said plurality of subsystems; and
   with said control system, sending said unique client identifier to said one of said plurality of subsystems.

14. The method of claim 13, further comprising, with said one of said plurality of subsystems, altering an operating behavior to keep a total energy usage rate of said electronic device below a predefined threshold.

15. The method of claim 14, wherein said energy usage rate comprises one of: an instantaneous energy usage rate and an average energy usage rate.

16. The method of claim 14, wherein said predefined threshold is set based on characteristics of a power supply of said electronic device.

17. The method of claim 13, further comprising, with said control system, receiving an expected power usage range from said one of said plurality of subsystems along with said request.

18. The method of claim 13, in which said energy usage data comprises at least one of: a cumulative energy usage and a time stamp.

* * * * *

UNITED STATES PATENT AND TRADEMARK OFFICE
CERTIFICATE OF CORRECTION

| | | |
|---|---|---|
| PATENT NO. | : 8,719,599 B2 | Page 1 of 1 |
| APPLICATION NO. | : 13/210006 | |
| DATED | : May 6, 2014 | |
| INVENTOR(S) | : Robert P. Callaway et al. | |

It is certified that error appears in the above-identified patent and that said Letters Patent is hereby corrected as shown below:

In the Claims

In column 8, line 31, in Claim 13, delete "thresholds;" and insert -- threshold; --, therefor.

Signed and Sealed this
Twenty-ninth Day of September, 2015

Michelle K. Lee
*Director of the United States Patent and Trademark Office*